United States Patent [19]
Koerber et al.

[11] Patent Number: 6,036,593
[45] Date of Patent: *Mar. 14, 2000

[54] CLOSURE DEVICE WITH LOCALLY DEFLECTED SPRING WIRE FOR A CLOSURE FLAP

[75] Inventors: Juergen Koerber; Tilo Volkmann, both of Sindelfingen; Juergen Chaloupka, Wetter, all of Germany

[73] Assignee: Daimlerchrysler AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,783

[22] Filed: Jul. 23, 1997

[30] Foreign Application Priority Data

Jul. 23, 1996 [DE] Germany ............................ 196 29 629

[51] Int. Cl.⁷ ...................................................... B24D 13/00

[52] U.S. Cl. ............................ 454/69; 454/142; 292/266; 292/271; 74/500.5

[58] Field of Search ..................................... 292/266, 277, 292/271, 275, DIG. 25, DIG. 16; 74/500.5, 18, 502.5, 501.6, 503, 538, 531, 536, 537, 527; 454/7, 30, 1, 266, 109, 126, 69, 142, 143; 137/351

[56] References Cited

U.S. PATENT DOCUMENTS

| | | | |
|---|---|---|---|
| 112,210 | 2/1871 | Bird | 292/275 |
| 1,346,383 | 7/1920 | Raab | 454/149 |
| 1,477,397 | 12/1923 | Underwood | 74/503 |
| 1,637,737 | 8/1927 | Cooper | 74/503 |
| 1,845,014 | 2/1932 | Aurlie | 292/271 |
| 1,932,444 | 10/1933 | Britton | 292/267 |
| 2,000,191 | 5/1935 | Riebe | 292/266 |
| 2,117,339 | 5/1938 | Claud-Mantle | 292/123 |
| 2,159,474 | 5/1939 | Drucks | 292/306 |
| 2,268,942 | 1/1942 | Jacobs | 292/275 |
| 2,268,977 | 1/1942 | Westrope | 16/86 C |
| 2,509,202 | 5/1950 | Arens | 74/503 |
| 3,244,194 | 4/1966 | Henry | |
| 3,257,928 | 6/1966 | Toplarski | 454/126 |
| 4,170,151 | 10/1979 | Olson | 74/501 R |
| 4,519,302 | 5/1985 | Nilsson | 98/2.08 |
| 4,611,502 | 9/1986 | Gregory | 74/502 |
| 4,793,206 | 12/1988 | Suzuki | 74/501.5 |
| 4,991,459 | 2/1991 | Stewart | 74/500.5 |
| 5,023,417 | 6/1991 | Magiera | 74/500.5 |
| 5,127,874 | 7/1992 | Wiles | 454/7 |

FOREIGN PATENT DOCUMENTS

| | | |
|---|---|---|
| 35 03 357 A1 | of 0000 | Germany . |
| 802 314 | of 0000 | Germany . |

OTHER PUBLICATIONS

Handbook of Fastening and Joining Metal Parts, McGraw–Hill Book Company, Inc., First Edition, 1956, 3 pages.

Bauelemente der Feinmechanik, Voss et al., VDI–Verlag GmbH, 1938, 3 pages.

*Primary Examiner*—Flemming Saether
*Assistant Examiner*—Gary Estremsky
*Attorney, Agent, or Firm*—Evenson McKeown Edwards and Lenahan P.L.L.C.

[57] ABSTRACT

A closure device for a closure flap, has an actuating element which is remote from the closure flap. A connecting rod is articulated pivotably on the closure flap and the actuating element to transmit tensile and compressive forces. The connecting rod is assigned to a position element, which is stationary with respect to the mounting of the closure flap, and is provided, at least in the region of the position element, with at least one spring element which acts transversely with respect to the longitudinal extent of said connecting rod. This spring element allows the connecting rod to be moved, by way of contact with the position element, into defined longitudinal positions with associated positions of the closure flap and actuating element. The connecting rod is preferably a spring wire incorporating a shaped spring element.

7 Claims, 1 Drawing Sheet

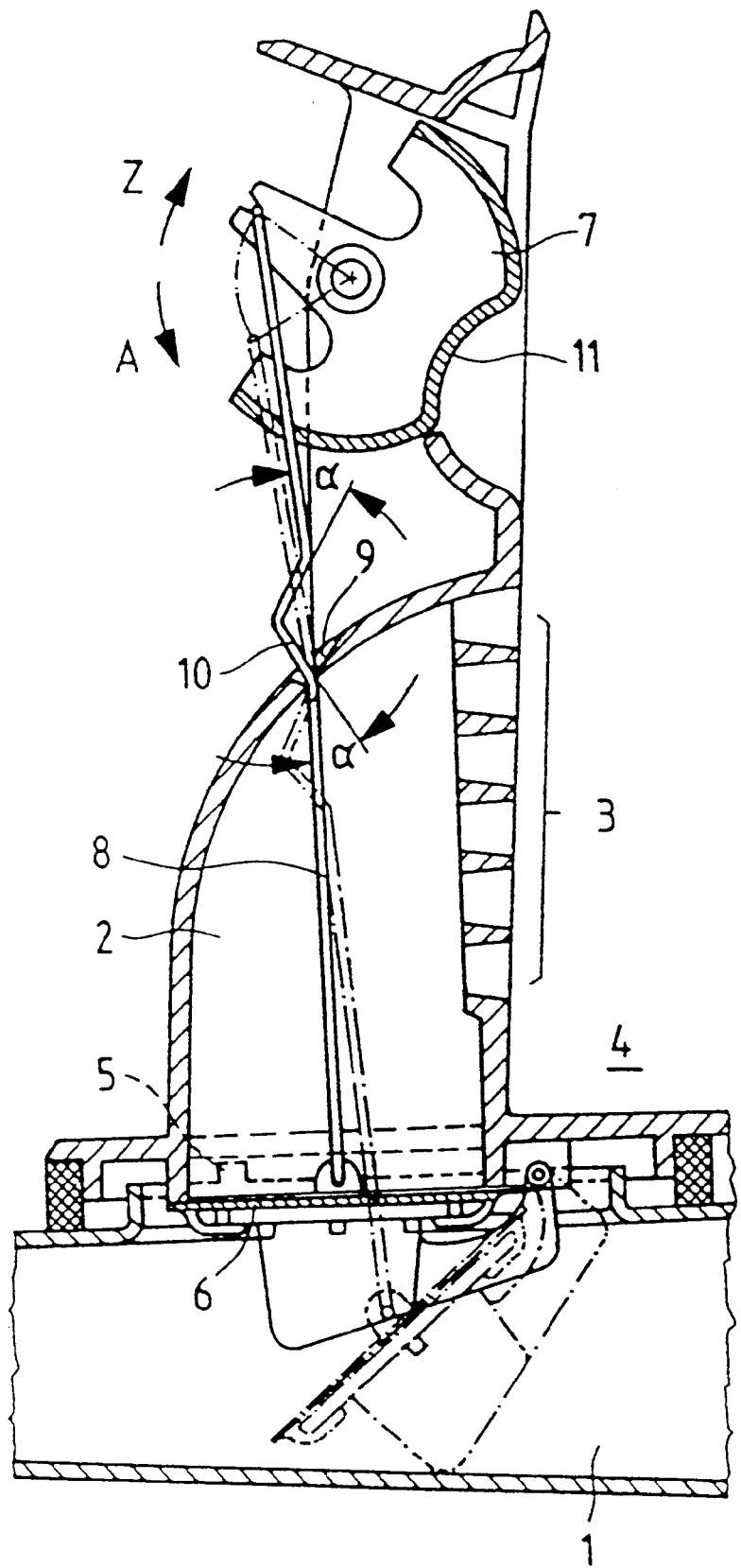

CLOSURE DEVICE WITH LOCALLY DEFLECTED SPRING WIRE FOR A CLOSURE FLAP

BACKGROUND AND SUMMARY OF THE INVENTION

The present invention relates to a closure device for a closure flap, and more particularly, to a closure device having an actuating element which is remote from the closure flap, and having a longitudinal displaceable spring wire which is articulated pivotably in each case on the closure flap and the actuating element, transmits tensile and compressive forces and of which the position can be determined by a position element, which is stationary with respect to the mounting of the closure flap, and in which device the actuating element is located outside a chamber which accommodates the closure flap.

U.S. Pat. No. 3,244,194 shows a relatively complicated and expensive closure device.

An object of the present invention is to simplify a closure device and configure it so that it can be produced as cost-effectively as possible. In the present invention, the closure flap should be located within a chamber which is sealed with respect to the atmosphere, and the actuating element for the closure flap should be located outside this chamber. Furthermore, the open position and the closed position of the closure flap should be settable in a stable manner.

The foregoing object has been achieved in accordance with the present invention by providing a closure device in which the position element is a slot through which the spring wire passes and which is located in a housing which accommodates the closure flap in a sealed manner with respect to the atmosphere, and in that, in that length region in which the spring wire, over its displacement path, can come to rest within the slot, said spring wire has at least one locally defined bend or deflection which runs transversely with respect to the longitudinal extent of said spring wire and, by way of frictionally locking latching on a border region of the slot, can establish at least an open position and closed position of the closure flap.

The present invention is based on the concept of providing the spring wire with a local deflection or bend between the closure flap and actuating element. Thereby, in conjunction with a position element which is stationary with respect to the mounting of the closure flap and is in the form of a spring-wire-guiding slot within a housing wall, at least a stable closed position and open position for the closure flap is achieved in a simple manner.

With the closure flap accommodated within a chamber which is sealed with respect to the outside, and with the actuating element located outside said sealed chamber, the spring wire is simply routed through a small slot in the outer wall of the sealed chamber. Part of the border of this slot, which only impairs the sealing of the chamber to a negligible extent, forms the stationary position element for defined positions of the spring wire with associated positions of the closure flap.

In order also to be able to obtain relatively secure intermediate positions between a closed end position and open end position of the closure flap, the spring wire should always butt, under spring stressing force, against the slot which constitutes the stationary position element.

In order merely to obtain stable end positions of the closure flap in a secure manner, it is sufficient to use a single deflection or bend of the spring wire in the displacement region of the spring wire which is assigned to the stationary position element. To avoid a pivot movement of the closure flap in the open position, a stop which defines the open position and is separate from the spring wire is advantageously provided as an abutment of the closure flap in the open position.

The actuating element of the closure device may be configured as a pivot lever in the form of a half-wheel. This half-wheel, which constitutes an adjustment wheel, may be provided, on its operation surface with a grip hollow.

If the closure flap is accommodated within a chamber which is sealed with respect to the outside and, thereby, should the actuating element be located outside this sealed chamber, then all that is required is for the connecting rod to be routed through an outer wall of the sealed chamber. For this purpose, a narrow slot is the only thing necessary if the connecting rod is configured as a spring wire. Part of the border of this slot automatically forms the stationary position element for defined positions of the connecting rod.

The closure flap of the closure device according to the present invention may be assigned, in particular, to a side duct of an air-channelling duct. This air-channelling duct may be part of a motor-vehicle air-conditioning system, in which the side duct is routed into a stowage compartment, of which the temperature is to be controlled by conditioned air.

BRIEF DESCRIPTION OF THE DRAWING

Other objects, advantages and novel features of the present invention will become apparent from the following detailed description of the invention when considered in conjunction with the sole figure which is a cross-sectional elevation view of a closure device in accordance with the present invention in an air-channeling housing.

DETAILED DESCRIPTION OF THE DRAWINGS

A side duct 2 branches off from an air-channelling duct 1 and channels conditioned air, for example, through an outlet 3 into a closeable stowage compartment 4 of a motor vehicle. The purpose of feeding air into a stowage compartment is to control the temperature of the latter, as desired, to be hot or cold. The opening 5, which leads from the air-channelling duct 1 into the side duct 2, can be closed by a pivotably mounted closure flap 6. The closure flap 6 is adjusted by an actuating element, which is configured as an adjustment wheel 7, via a spring wire 8, which serves as a connecting rod between the adjustment wheel 7 and the closure flap 6. This spring wire 8 is articulated pivotably on both the adjustment wheel 7 and the closure flap 6. The adjustment wheel 7 is located outside the ducts 1, 2. The spring wire 8 is thus routed through a slot 9 in an outer wall of the side duct 2.

A rotary movement through approximately 90° of the closure flap 6 equates to movement of the closure flap 6 between its closed position and its open position. For a stable end position in both the open position and closed position of the closure flap 6, the spring wire 8 has a deflection or bend 10 in its region which is adjacent to the slot 9 of the side-duct wall. With respect to the longitudinal axis of the spring wire 8, the bend 10 has an approximately acute-angled bent section, which is indicated by the angles α.

The bend 10 is arranged, and defined, along the spring wire 8 such that the regions of transition from this bend 10 to the rectilinear path of the spring wire 8 are situated at a location which, when butting against the slot 9, causes the closure flap 6 to be located either in its open position or in its closed position.

The location at which the spring wire 8 butts against the slot 9 in each is the position element according to the present invention, which is stationary with respect to the mounting of the closure flap 6. Consequently, the numeral 9 constitutes designates both the slot in the outer wall of the side duct 2 and the stationary position element according to the invention.

The slot 9 and the bend 10 of the spring wire 8 are associated such that, within the slot 9, the connecting line between the points of articulation of the spring wire 8 on the adjustment wheel 7 and the closure flap 6 executes only a slight pivot movement, if any at all, when the adjustment wheel 7 is adjusted.

In the pivot plane of the adjustment wheel 7 and of the closure flap 6, the spring wire 8 is provided between the adjustment wheel 7 and closure flap 6 such that, in all pivot positions of the closure flap 6, the spring wire 8 butts in a resilient manner against the same end of the slot 9.

The solid-line illustration of the closure flap 6 with spring wire 8 articulated thereon shows the closure flap 6 in the closed position. The bend 10 of the spring wire 8, this bend, in this state, being located outside the side duct 2, provides a stable closed position for the closure flap 6.

In order to open the closure flap 6, the bend 10 has to be routed through the slot 9, for which purpose it is necessary to overcome a spring force originating from the bend 10. As soon as the tip of the bend 10 has passed through the slot 9 in the course of opening the closure flap 6, the spring force originating from the bend acts in a direction which causes the closure flap 6 to open. As soon as the closure flap 6 butts against the inner wall of the air-channelling duct 1, in which case the flap 6 is fully open, the closure flap 6 is located in a stable open position. This is because, in order to close the flap, it is first of all necessary, once again, to overcome the spring force originating from the bend 10, in order for it to be possible for the tip of the bend 10 to be positioned outside the side duct 2 again.

The open position of the closure flap 6, with the associated position of the spring wire 8, is depicted in the drawing by dashed lines. The adjustment wheel 7 is provided with a grip hollow 11 so that it can be actuated conveniently with the finger or thumb of one hand. The arrow depicted alongside the adjustment wheel 7 indicates, by its directional arrow A, the direction of movement for opening the closure flap 6 and, by its directional arrow Z, the direction of rotation for closing said flap 6.

The closure flap 6 may be a plastic part, which can be mounted in a bearing produced by latching.

The connecting rod can be configured as a thin spring wire 8 such that a small through-passage through the wall of the side duct 2 is possible, this resulting in only a small gap which usually does not require any additional sealing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A closure device, comprising a closure element with an open end position and a closed end position, an actuating element spaced from the closure element, a position element arranged between the closure element and the actuating element, and a displaceable spring wire connected pivotally at one end thereof with the closure element and at another end thereof with the actuating element, an intermediate portion of the wire being arranged to pass through a slot in the position element, the intermediate portion being shaped and being sized relative to the slot such that movement of the actuating element to open and close the closure element causes approximately rectilinear movement of the intermediate portion of the wire through the slot and a stable positioning of the wire on either side thereof, whereby the intermediate portion of the spring wire has a bend which is configured to be in interference with edge portions of the slot such that the spring wire is resiliently deformed with movement of the closure element to end positions thereof, thereby allowing the closure element to achieve stable and secure end positions.

2. The closure device according to claim 1, wherein the spring wire has only one portion with end regions assigned respectively to an open position and a closed position of the closure element.

3. The closure device according to claim 2, wherein, in the open position, the closure element butts against a stop.

4. The closure device according to claim 1, wherein the actuating element is a pivot lever configured as a rotatable adjustment member.

5. The closure device according to claim 4, wherein, the rotatable adjustment member has a grip hollow thereof on a curved operating surface thereof.

6. The closure device according to claim 1, wherein the closure element is operatively connected with a side duct of an air-channelling duct.

7. The closure device according to claim 6, wherein the air-channelling duct is incorporated in a motor-vehicle air-conditioning system, and the side duct leads into a motor vehicle stowage compartment, with conditioned air means for controlling temperature of the compartment.

* * * * *